3,455,752
METHOD OF MANUFACTURING ELECTRIC WIRES COVERED WITH PLASTICS
Alvin N. Gray, 474 41st Ave., St. Petersburg Beach, Fla., and Yasuya Tamura, 34 Miyagaya, Nishi-ku; Kojiro Shibata, 136 Nishi-machi, Mitsuzawa, Kanagawa-ku, and Reikichi Nakayama, 34 Miyagaya, Nishi-ku, all of Yokohama, Japan
No Drawing. Continuation-in-part of application Ser. No. 228,244, Oct. 4, 1962. This application Nov. 29, 1965, Ser. No. 510,372
Claims priority, application Japan, Oct. 12, 1961, 36/36,890; Mar. 7, 1962, 37/9,008
Int. Cl. H01b 13/14
U.S. Cl. 156—51                6 Claims

ABSTRACT OF THE DISCLOSURE

Cross-linked polyethylene covered electric wires are made by covering the wires with a cross-linkable mixture of polyethylene and dicumyl peroxide which has been prepared by mixing particulate polyethylene or a polyethylene compound of grain size of 1 mm. or more with 0.1–10.0 parts by weight of molten dicumyl peroxide, and stirring same at a temperature range whose lower limit is the melting point of dicumyl peroxide and upper limit is the softening point of polyethylene, which is lower than the decomposition temperature of dicumyl peroxide, whereby the dicumyl peroxide is directly coated on the granules.

---

This application is a continuation-in-part of application Ser. No. 228,244, filed Oct. 4, 1962, now abandoned.

The present invention relates to an improvement in the method of manufacturing cross-linked polyethylene covered electric wires.

A feature of this invention is the provision of a method of manufacturing cross-linked polyethylene covered electric wires wherein partial thermal decomposition of dicumyl peroxide cross-linking agent due to thermal hysteresis in the course of material preparation is prevented, comprising directly coating the surface of particulate polyethylene resin in powder or granular form with dicumyl peroxide by mixing 100 parts by weight of said particulate polyethylene resin having a diameter of not less than 1 mm. with 0.1–10.0 parts by weight of molten dicumyl peroxide and stirring same at a temperature not exceeding the softening point of polyethylene, which softening point being not exceeding the decomposition temperature of dicumyl peroxide, but not lower than the melting point of dicumyl peroxide, and, cooling the mixture to room temperature, and extruding same over electric wires.

Another feature of this invention is the provision of a method of manufacturing cross-linked polyethylene covered electric wires wherein partial thermal decomposition of dicumyl peroxide due to thermal hysteresis in the course of material preparation is prevented, comprising adding 0.1–10.0 parts by weight of fine-powdery antioxidant to 100 parts by weight of particulate polyethylene resin having a diameter of not less than 1 mm. and stirring same at a temperature not exceeding the softening point of polyethylene, which softening point being not exceeding the decomposition temperature of dicumyl peroxide, but not lower than the melting point of dicumyl peroxide, and then adding to same 0.1–10.0 parts by weight of molten dicumyl peroxide and continuing stirring so that the surface of the polyethylene has the antioxidant adhered thereto and the dicumyl peroxide coated thereon, cooling the mixture to room temperature, and extruding same over electric wires.

Another feature of this invention is the provision of a method of manufacturing cross-linked polyethylene covered electric wires wherein said particulate polyethylene is in pellet form compounded with pigment, filler, plasticizer, antioxidant stabilizer and the like.

According to the conventional method of producing cross-linked polyethylene covered electric wire by extruding over the conductor a mixture of polyethylene and cross-linking agent, granular polyethylene and cross-linking agent are mixed with rolls or an internal mixer, and, after having been made into a strip, cut into granules again with a granulator, and then fed to an extruder to be extruded over the conductor. In such a method, in order to uniformly disperse the cross-linking agent in the polyethylene, the mixture is kneaded by rolls or a mixer, and then the kneaded product is granulated by crushing. In the course of this mixing of the cross-linking agent, which is highly sensitive to heat, there is a certain decomposition of the cross-linking agent because the temperature in either the rolls or the internal mixer is measured only as an average temperature. It is physically impossible to measure the maximum temperature which occurs in the bite of the rolls only, such as, in the case of mills, in the comparable close tolerance of the rotor against the sides of the internal mixer. The result is frequently that at the point of maximum heat generation the temperature of the materials at these points sometimes exceeds the maximum temperatures which the cross-linking agent will resist before decomposition. This local decomposition which takes place in either the rolls or the internal mixer results in partially cross-linked polyethylene which causes rough extrusion.

After a study to eliminate such a defect, the inventors have found a method of manufacturing cross-linked polyethylene covered electric wires without employing the aforesaid mixing process. According to this method, we add to particulate polyethylene or polyethylene compounded with containing filler, such as carbon black, clay and calcium carbonate, antioxidant, such as thiobis(6-tertiary-butyl-3-methylphenol) and polymerized trimethyl-dihydroquinoline, pigment, such as titanium white and red oxide, stabilizer, such as substituted benzophenone and plasticizer, such as polybutene added by means of rolls or internal mixer, dicumyl peroxide in powdery and molten state as a cross-linking agent, and stir same in an agitator, such as a tumbler or a blender, at a temperature below the softening point of polyethylene, which softening point being lower than the decomposition temperature of dicumyl peroxide, but above the melting point of said peroxide, thereby coating said peroxide on the polyethylene granules or pellets.

The material thus produced is cooled to room temperature and then fed to an extruder so as to be extruded over the conductor. Since the material thus prepared is not subjected to such temperatures as cause dicumyl peroxide to decompose, there develops no partial cross-linking before being supplied to an extruder as is the case with conventional methods. It has, therefore, excellent processibility in extrusion, and its extruded products display fine appearances. The shape of the polyethylene need not be specifically defined, but, usually, grain size of 1 mm. dia. or over is most suitable. The quantity of the cross-linking agent to be attached to the surface of polyethylene may be usual amount and preferably 0.1 to 10 parts by weight of cross-linking agent to 100 parts by weight of polyethylene.

The invention is explained by examples as follows:

Example 1

100 parts by weight of granular polyethylene and 3 parts by weight of dicumyl peroxide, which had previously melted at 50° C., were agitated in a ribbon-blender kept at 50° C. so that said dicumyl peroxide was coated on the surface of said polyethylene granules, and then, after being cooled to room temperature, fed to a continuous vulcanizer so as to obtain a cross-linked polyethylene covered electric wire by the use of 2.0 mm. dia. conductor.

Example 2

0.5 part by weight of an antioxidant of phenols was added to 100 parts by weight of granular polyethylene, and, after the mixture was thoroughly agitated in a tumbler kept at 50° C., 3 parts by weight of dicumyl peroxide previously melted at 50° C. was added thereto and, through continued agitation, dicumyl peroxide and antioxidant were coated uniformly on the surface of said polyethylene. Then after being cooled to room temperature, the mixture was supplied to a continuous vulcanizer so as to obtain a cross-linked polyethylene covered electric wire having 4.6 mm. outer dia. by the use of 2.0 mm. conductor.

Example 3

A kneaded polyethylene mixture consisting of 100 parts by weight of polyethylene, 50 parts by weight of carbon black and 0.5 weight part of anti-oxidant mixed by means of rolls or an internal mixer. And, after being once made into a strip, cut into granules again with a granulator, and then fed to a tumbler kept at 50° C. and 3 parts by weight of dicumyl peroxide previously melted at about 50° C. were added and agitated so that dicumyl peroxide was coated on the surface of said polyethylene mixture. By using this mixture cross-linked polyethylene covered electric wires were made in the same manner as in Example 1.

Example 4

100 parts by weight of granular polyethylene and 3 parts by weight of powdery dicumyl peroxide were agitated in a ribbon-blender kept at 80° C. so that said dicumyl peroxide was coated on the surface of said polyethylene granules, and then, after being cooled to room temperature, fed to a continuous vulcanizer so as to obtain a cross-linked polyethylene covered electric wire by the use of 2.0 mm. dia. conductor.

According to the method of manufacturing electric wires covered with cross-linked polyethylene of the invention, the processability is considerably superior to that of the conventional method and, moreover, the electric wire made by the method under the present invention show very excellent heat resistance, electric properties, chemical resistance and appearance equal to those of conventional wires. Furthermore, the method under the present invention has great advantages in that it simplifies the manufacturing process and remarkably improves productivity.

What we claim is:

1. Method of manufacturing cross-linked polyethylene covered electric wires wherein partial thermal decomposition of dicumyl peroxide cross-linking agent due to thermal hysteresis in the course of material preparation is prevented, comprising directly coating the surface of powdery polyethylene resin, granular polyethylene resin or pelleted polyethylene compound containing ingredients with dicumyl peroxide by mixing 100 parts by weight of said powdery polyethylene resin, said granular polyethylene resin or said pelleted polyethylene compound containing ingredients and having a diameter of not less than 1 mm. with 0.1–10.0 parts by weight of molten dicumyl peroxide and stirring same at a temperature not exceeding the softening point of polyethylene, which softening point being not exceeding the decomposition temperature of dicumyl peroxide, but not lower than the melting point of dicumyl peroxide, cooling the mixture to room temperature, and extruding same over electric wires.

2. Method of manufacturing cross-linked polyethylene covered electric wires wherein partial thermal decomposition of dicumyl peroxide due to thermal hysteresis in the course of material preparation is prevented, comprising adding 0.1–10.0 parts by weight of fine-powdery antioxidant to 100 parts by weight of powdery polyethylene resin, granular polyethylene resin or pelleted polyethylene compound containing ingredients and having a diameter of not less than 1 mm. and stirring same at a temperature not exceeding the softening point of polyethylene, which softening point being not exceeding the decomposition temperature of dicumyl peroxide, but not lower than the melting point of dicumyl peroxide, and then adding to same 0.1–10.0 parts by weight of dicumyl peroxide and continuing stirring so that the surface of the polyethylene has the antioxidant adhered thereto and the molten dicumyl peroxide coated thereon, cooling the mixture to room temperature, and extruding same over electric wires.

3. Method according to claim 1, wherein said pelleted polyethylene compound contains pigment, filler plasticizer, antioxidant and stabilizer as said ingredients.

4. Method according to claim 2, wherein said pelleted polyethylene compound added with said antioxidant contains pigment, filler, plasticizer and stabilizer as said ingredients.

5. Method according to claim 1, wherein said pelleted polyethylene compound contains pigment and filler as said ingredients.

6. Method according to claim 2, wherein said pelleted polyethylene compound added with said antioxidant contains pigment and filler as said ingredients.

References Cited

UNITED STATES PATENTS

| | | | |
|---|---|---|---|
| 2,888,424 | 5/1959 | Precopio et al. | 174—110 X |
| 2,945,828 | 7/1960 | Henning | 264—54 X |
| 3,051,992 | 9/1962 | Bradley | 264—347 X |
| 3,325,325 | 6/1967 | Ward | 156—56 |
| 3,350,312 | 10/1967 | Gross et al. | 174—110 X |

EARL M. BERGERT, Primary Examiner

T. R. SAVOIE, Assistant Examiner

U.S. Cl. X.R.

156—244; 264—236